United States Patent [19]

Zebarth

[11] 4,388,811
[45] Jun. 21, 1983

[54] METHOD FOR PREPARING POULTRY FOR FRESH-PACK HANDLING

[75] Inventor: Ralph S. Zebarth, Gainesville, Ga.

[73] Assignee: Meyn U.S.A., Inc., Baldwin, Ga.

[21] Appl. No.: 304,614

[22] Filed: Sep. 22, 1981

[51] Int. Cl.³ .............................................. F25D 13/02
[52] U.S. Cl. ........................................ 62/63; 62/380; 426/524
[58] Field of Search .................... 62/63, 64, 65, 374, 62/380; 426/524

[56] References Cited

U.S. PATENT DOCUMENTS

| | | | |
|---|---|---|---|
| 2,942,429 | 6/1960 | Van Dolah et al. | 62/64 |
| 3,103,696 | 9/1963 | De Long | 17/44.1 |
| 3,164,967 | 1/1965 | Marshall | 62/63 |
| 3,410,101 | 11/1968 | Morris, Jr. | 62/63 |
| 3,468,135 | 9/1969 | Doll et al. | 62/63 |
| 3,555,838 | 1/1971 | Morris, Jr. | 62/63 |
| 3,715,891 | 2/1973 | Martin | 62/63 |
| 3,769,807 | 11/1973 | Foster | 62/63 |
| 4,028,774 | 6/1977 | Allan et al. | 17/24 |
| 4,230,732 | 10/1980 | Paradise, Jr. et al. | 426/480 |
| 4,325,221 | 4/1982 | Grewar | 62/64 |

Primary Examiner—Ronald C. Capossela
Attorney, Agent, or Firm—Julian W. Dority

[57] ABSTRACT

A method of preparing poultry for fresh-pack handling in which the eviscerated carcasses are first thoroughly washed, then passed through a non-refrigerated water bath to pick up moisture, then tumbled to substantially equalize the moisture content of the carcasses, and to remove some of the picked-up moisture, then gravity drained to remove more of the picked-up moisture, and finally subjected to a supercold atmosphere for a time sufficient to freeze-crust it, whereby to reduce the picked-up moisture to a permissable level and thereafter to stabilize the carcasses against weepage. Routing of the carcasses and the giblets removed during evisceration may be so arranged that freeze-crusted giblets may be stuffed into carcasses before the latter are crusted, for greater ease of handling.

8 Claims, 3 Drawing Figures

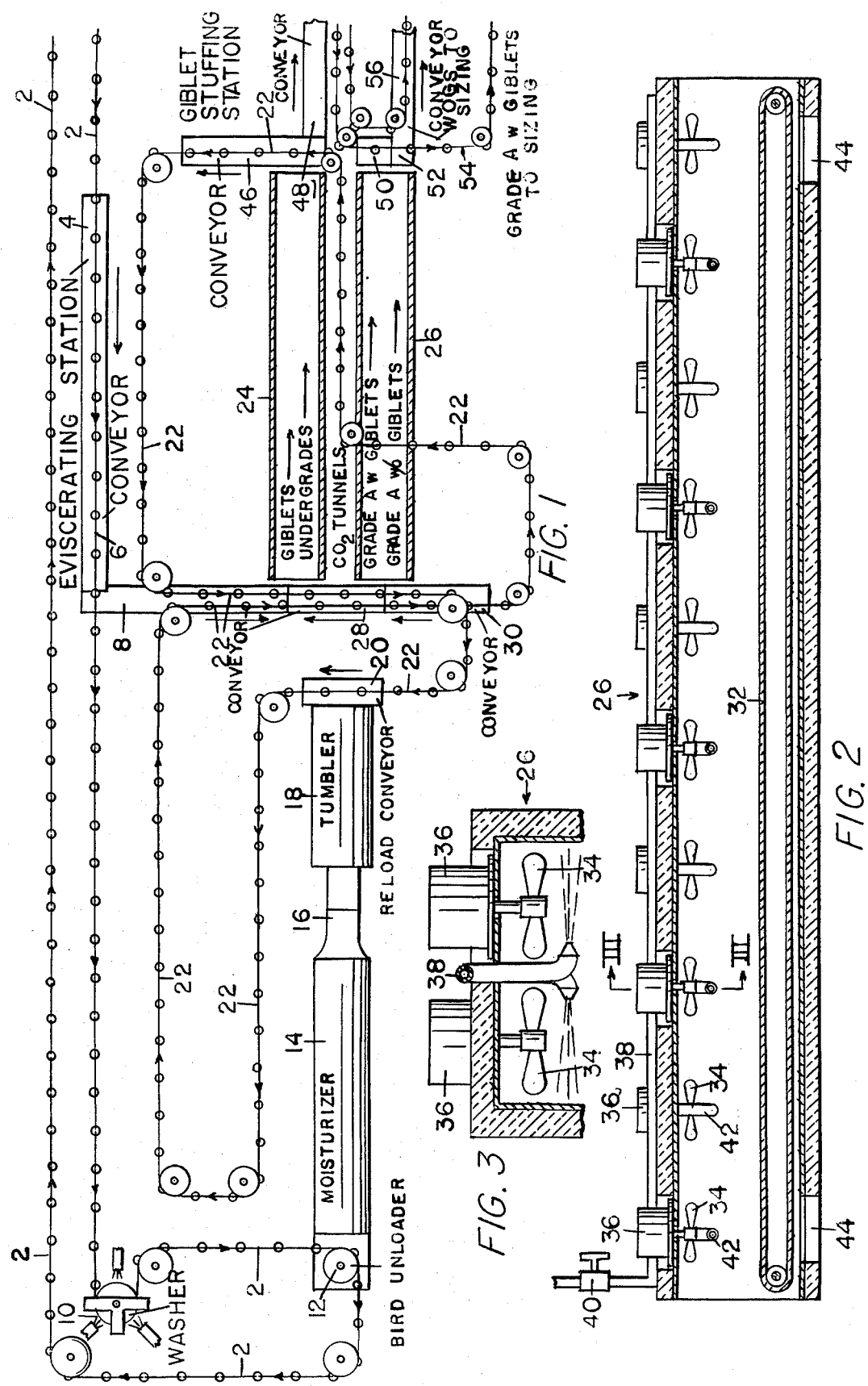

METHOD FOR PREPARING POULTRY FOR FRESH-PACK HANDLING

This invention relates to new and useful improvements in methods of preparing poultry for fresh-pack, or non-frozen, condition. A large and growing proportion of all poultry sold is sold in this form, since it has a better customer appeal and commands higher prices, but there are numerous problems in connection with this type of preparation by commonly used methods.

Perhaps the most commonly used method at this time is to first wash and chill the eviscerated poultry carcasses in an ice water bath, removing all body heat and reducing their temperature to as low a figure as is practically possible by this means, perhaps 34–38 deg. Fahr. For fresh packing, it is then cut up into parts, if it is to be sold in this condition, or it may be left in whole carcasses. The carcasses, or parts, are then packed or packaged with crushed ice or other refrigeration, and maintained at about the same 34–38 degree temperature throughout storage, shipping and display for sale.

However, this method has many problems connected therewith. It is extremely difficult to maintain the ice water chilling bath adequately clean, it often becoming contaminated with body wastes such as intestinal remnants and fecal matter remaining from the evisceration process. Ice itself is quite expensive in the huge quantities used in a poultry processing plant. The product itself, being at a temperature above freezing, is subject to bacterial growth on and in the carcass, and consequently has a relatively short shelf life before it must be discarded as unsafe for consumption. If it is cut up in this unfrozen condition, the cut-up is difficult, since the flesh yields or flows ahead of the cutting knives, and the skin tends to pull away from the flesh and hence to be cut unevenly. Also the cutting of muscle fibers while it has some degree of resilient tension tends to cause the fibers to contract into relatively hard masses, thereby imparting an undesirable toughness to the meat. Further, the cut-up of the unfrozen carcasses causes "weepage", or loss of body fluid and weight, as will be more thoroughly discussed below.

Weepage, which may be defined as the gradual loss of moisture, or other body fluids, from the unfrozen carcasses, is perhaps the most vexing, and expensive, problem for processors of fresh-pack poultry. This weepage occurs continuously after the carcasses leave the chilling bath, all during handling, storage and shipping, and results in a gradual but continuous loss of weight. Such weepage is damaging to the meat itself, in that the meat tends to become dehydrated and hence tough, and through the loss of body fluids to lose certain desirable attributes of nutrition and flavor. For these reasons the addition of some pick-up moisture to the carcasses is desirable, and U.S.D.A. regulations hence permit the presence of up to 8% pick-up moisture at the time of sale. Nevertheless, the weight loss occasioned by weepage is a constant problem to the processor, since he must sell his product by weight. A processor will often place about 2½ pounds of chicken as tare weight in a standard 70 pound shipping carton, or 72½ pounds per carton, in order to allow for weepage weight loss. Nevertheless, his customers enter short-weight charge-backs against him, which he either must allow in the absence of means for checking all delivery weights, or engage in continual disagreements with his own customers. Actual weight loss by weepage may vary quite substantially due to many variables, such as possible overloading of packing cartons with consequent variable pressures on the birds, possibly inaccurate temperature controls, the position of a carton in a stack of cartons, the number of handlings of the cartons, how severely the cartons may be jostled due to rough roadbeds over which they are transported, and others. Also, if a non-frozen carcass at 34–38 degrees is cut up into parts, it will lose about 2% of its weight due to weepage.

Accordingly, the overall object of the present invention is the provision of a method of preparing poultry for fresh-pack handling which largely solves all of the above enumerated problems connected with ice chilling and packing, in that it virtually eliminates contamination of the moisturizing, pre-chilling water bath, does not require the use of ice or mechanical refrigeration, but instead utilizes readily available liquid carbon dioxide for freeze-crusting purposes, which greatly inhibits bacterial growth on the poultry, which greatly facilitates cut-up of the carcasses if this is desired, so that it may be cut up without resulting toughening of the meat or imparting an undesirable appearance, and which virtually completely seals the carcasses against weepage at any later stage of handling, shipping, storage or display. Generally, the process contemplated by the present invention includes the steps of first washing the carcasses thoroughly, inside and out, with jets of unrefrigerated water, then agitating them in a bath of unrefrigerated water to pre-cool them and add pick-up moisture thereto, then tumbling the carcasses to equalize the amount of pick-up moisture carried by each carcass, to reduce the general level of pick-up moisture content somewhat, then draining the carcasses by gravity to remove surface moisture, and finally subjecting them to a supercold atmosphere, such as may be obtained by directing expanded liquid carbon dioxide in rapidly moving currents over the carcasses for a time to freeze-crust said carcasses. The freeze-crusting shrinks the skin to squeeze out pick-up moisture from the fatty fascia layer under the skin to reduce the pick-up moisture level to the allowable amount of 8%, and to remove sufficient body heat that when a carcass is then allowed to temper to an even temperature throughout, it will be below the 32 deg. Fahr. freezing point of water, but above the 26 deg. Fahr. freezing point of the flesh, say ideally in a 28–30 deg. Fahr. range, in a very short time. At this temperature the flesh is unfrozen, and hence fresh, but neither moisture nor body fluids can melt or flow. In other words, the carcass will not "weep", and will not do so at any later time as long as this temperature is maintained, either during possible later cup-up, or during storage, shipping and handling. The routing of the carcasses may be so arranged that giblets removed from the carcasses during evisceration may be freeze-crusted before being inserted into uncrusted carcasses, it being extremely difficult to stuff uncrusted giblets into either crusted or uncrusted carcasses, and to provide that the various forms of product are delivered to suitable stations for further processing. Such product forms include Grade A (perfect) carcasses with giblets inserted, Grade A carcasses without giblets (commonly known as "Wogs"), undergrade carcasses, usually downgraded because of missing legs, wings or other parts cut away during inspections because of faults or blemishes, and the giblets themselves, which may or may not be inserted into carcasses.

With the above objects in view, as well as other objects which will appear in the course of the specification, reference will be had to the accompanying drawing, wherein:

FIG. 1 is a diagrammatic top plan view of an apparatus capable of performing the method or process contemplated by the present invention, FIG. 2 is a longitudinal vertical sectional view of a carbon dioxide tunnel suitable for use in the present method, and FIG. 3 is an enlarged, fragmentary sectional view taken on line III—III of FIG. 2.

Like numerals apply to similar parts throughout the drawing. Poultry carcasses suspended at regular intervals by shackles from an overhead conveyor chain 2 enter FIG. 1 at the upper right thereof. The birds have previously been killed, bled, scalded, and the feathers removed by picking machines. The carcasses then proceed to an eviscerating station 4, where they are removed from the line, eviscerated by human operators using knives to remove the neck and other giblets, namely the heart, gizzard and liver, and also the viscera and feet, which are discarded at this time. A set of giblets, including a neck, heart, gizzard and liver, is assembled, wrapped in paper, and the wrapped sets are placed on a conveyor belt 6, which transfers them to a conveyor belt 8 for transport to the $CO_2$ tunnels, as will be described. The eviscerated carcasses are rehung on conveyor chain 2, and proceed next to a washing station 10 where each carcass is thoroughly washed, both inside and out, by any suitable means, such as water jets directed against and into it. The purpose of the washing is principally to remove contaminants which otherwise would remain with the birds, such as intestinal and fecal matter which might remain from the evisceration process. The washing water need not be refrigerated, although if ordinary tap water is used, it will be much colder than the birds, and will reduce the carcass temperature perhaps 5 degrees from the aproximately 90 degree temperature at which they arrive at the washer after evisceration. The washing water will also add perhaps 2.5–3.0% of pick-up moisture to the carcasses. However, these figures are not critical.

The carcasses next proceed to a bird unloader station 12, where they are removed from conveyor 2 and deposited in a moisturizer 14, either manually or by automatic machinery. In the moisturizer, the carcasses are agitated in a bath of unrefrigerated water. It may be of any suitable form, such as an elongated tank containing water, in which the carcasses are agitated and through which they are propelled by power-driven paddles within the tank. The function of the moisturizer is both to pre-chill the carcasses, reducing their temperature perhaps 15 degrees to about 70 deg. Fahr., but more importantly to add substantial quantities of moisture thereto, substantially in excess of the ultimately allowable 8%, which gathers principally in the fatty fascia layers beneath the skin and also to some extent in the skin itself, and also in pockets between the skin and the flesh, particularly where the skin is usually loose, such as in the lower abdominal area and the inner surfaces of the thighs. However, it is not desirable to add only the allowble and desirable 8% pick-up moisture at this time, first because some of this moisture will inevitably be lost during handling and in later stages of the process, and second because the water which gathers in the pockets between the skin and flesh above referred to would later form free ice, which is not permitted by inspectors and cannot be sold to customers as meat. Therefore, more than the desired 8% moisture is added to compensate for that which will later be lost or removed. The problem of water gathering in pockets between the skin and flesh is particularly evident in carcasses which have been miseviscerated, that is, eviscerated with clumsy, overlong or jagged cuts, which tends to open more packets into which water may flow. For this reason, it is also true that many carcasses will pick up considerably more moisture than others. It has been found that an average moisture pick-up of about 11–14%, prefereably in the lower portion of this range, will produce optimum results at the end of the process. Due to the use of washer 10 ahead of moisturizer 14, there is very little if any problem of contamination in the moisturizer.

At the downstream end of the moisturizer, the carcasses are elevated from the water in the moisturizer at 16, and deposited in a tumbler 18, in which the only water present is that which enters with the carcasses, and in which the carcasses are slowly tumbled in a mass for a pre-determined time period. The tumbler may take any suitable form, for example a slowly rotating cylindrical drum through which the carcasses are propelled as they are tumbled by a slight downward inclination of the drum toward its downstream end. The function of the tumbler is the removal of moisture from the carcasses. This moisture removal is somewhat selective, it having been found that while tumbling will remove very little of the water from the fascia layers or from the skin, the impacts to which the carcasses are subjected during tumbling are extremely effective in expelling water from the pockets between the skin and flesh as above described. Thus the unpermissable water pockets are eliminated, and also the moisture pick-up of miseviscerated birds will be equalized with that of the properly eviscerated birds. For a reason which will presently appear, it is desired that the carcasses arrive at the downstream end of the tumbler with about 9–10% pick-up moisture, perhaps averaging 9.5%, in the skin and fascia, although they may emerge from the tumbler with additional surface water or water trapped therein.

At the downstream end of the tumbler, the carcasses are removed therefrom to a conveyor belt 20, from which they are reloaded onto a second overhead conveyor chain 22, and conveyed thereby along an elongated path to the entry ends of a pair of freeze tunnels 24 and 26. The number of tunnels used is optional. During the elongated path of travel preceding the freeze tunnels, surface water and interiorly trapped water drains from the carcasses, but no appreciable amount of the fascia and skin moisture drains away, so that the carcasses arrive at the freeze tunnels with the desired 9–10% pick-up moisture. Drainage of significant amounts of the skin and fascia moisture would require many hours. At the entry ends of the freeze tunnels, conveyor 22 passes over conveyor belt 8 and other conveyor belts 28 and 30 passing therebeneath, all moving in directions to convey any product placed thereon toward the tunnels. Carcasses arriving on conveyor chain 22 are unloaded to the belts, and fed into the freeze tunnels. The routing of the carcasses and giblets will be more specifically described at a later time.

The freeze tunnels may have different forms, but effectively may take the form shown in FIGS. 2 and 3, each constituting an elongated horizontal tube, heavily insulated, and square as shown, and having in the lower portion thereof a conveyor belt 32 driven to carry product deposited thereon from one end of the tube to the other. Distributed along the length of the tube, in the top thereof, are a series of blowers 34, each driven by an electric motor 36, and capable of directing high-velocity currents of gas downwardly over the product on belt 32. Liquid carbon dioxide, supercooled below its freezing point but maintained in liquid form by pressurization, is delivered by a pipe 38 controlled by a valve 40 to a series of nozzles 42 each directing the liquid gas horizontally immediately below one of blowers 34. Upon emergence from the nozzles and release of its pressure, the liquid gas expands and is almost instantly converted into extremely cold, about equal proportions of small pellets of solid $CO_2$, or "dry ice", and $CO_2$ gas, which are blown at high velocity downwardly over the poultry product on belt 32. Aside from its structural makeup, the process function of these tunnels is that the poultry carcasses on the belt are rapidly "freeze crusted", the skin freezing hard at its surface, but with considerable heat remaining in the thicker portions of the meat, which is thus not frozen. It is desired that enough heat be removed by the crusting operation that when the carcass emerges from the tunnel and is allowed to equalize or "temper" its temperature throughout its mass, it will be below the 32 degree freezing point of water, but above the 26 degree freezing point of the flesh. Thus substantially no further weepage or loss of moisture can occur during cutup, handling, storage or shipping, so long as the temperature is maintained in that range. Any free water, being frozen, cannot melt and be lost, hence precluding any weight loss, and the body fluids cannot flow, hence precluding their loss and preserving desirable characteristics of nutritional quality and flavor. Also, since the meat is below the freezing point of water, any bacterial growth on or in it is greatly inhibited, thereby increasing the shelf life of the product. A tempered temperature of about 28–30 deg. Fahr. is considered ideal. Means, not shown, but which could constitute curtains at each end of the tunnel, are preferably utilized to inhibit the escape of $CO_2$ from the tunnel, and apertures 44 may be provided at the bottom of the tunnel for escape of this gas, which is then preferably piped out-of-doors to maintain the air in the processing plant in a breathable condition.

In the freeze-crusting process, the carcass' skins shrink rapidly and forcibly. This shrinkage forces pick-up moisture from the skin through its pores and from the fascia layers beneath the skin, principally at the edges of the skin cuts made during evisceration, in the manner of water expelled by pressure on a soaked sponge. Extensive tests have shown that poultry carcasses will lose about 1.5 to 2.0% of their pick-up moisture during freeze-crusting, regardless of their moisture content at the start of the crusting operation. Longer retention in the tunnels, after crusting is completed, will expel almost no more moisture, since it will then be hard-frozen. Thus, if the carcasses arrive at the tunnels with 9–10% of pick-up moisture, with an average of about 9.5%, the crusting may be relied on to reduce their moisture content to or slightly below 8%, which is the allowable and desired amount. It is for this reason that carcasses should arrive at the tunnels with 9–10% of moisture pick-up. This condition may be obtained by properly coordinating washer 10 and moisturizer 14, which add water to the carcasses in amounts which may be varied for example, by varying the number of water jets and time of exposure thereto at the washer, or by varying the paddle speed or length of time the carcasses are retained in the moisturizer, with tumbler 18, which removes moisture from the carcasses in amounts which could be varied for example by varying the rotational speed, length or slope of the tumbler. Any precise control of the temperature at which the carcasses arrive at the freeze tunnels is not as important as control or their moisture content, except of course insofar as that any heat previously removed by washing and moisturizing need not be removed in the freeze tunnels. Any reasonable variation of sensible temperature at this point is so slight in comparison to the total amount of both sensible and latent heat which must be removed in the tunnels as to make little difference in the necessary carcass retention time in the tunnels. However, if necessary, said retention time could be varied by adjusting the travel speed of conveyor belt 32.

Other means than the $CO_2$ tunnels described could be used for creating the supercold atmosphere necessary for freeze-crusting, such as mechanical refrigeration systems. However, the $CO_2$ method is substantially more economical than mechanical systems, and is far more efficient for producing lower temperatures than are practical with mechanical systems, in order that the crusting may be accomplished in a shorter time period. Thus neither ice nor mechanical refrigeration are used in this process, both of which represent major expense items in modern poultry processing plants. The expansion of the $CO_2$ produces a temperature of about −100 deg. Fahr. and the high velocity imparted to the gas and "dry ice snow" by blowers 34 as they flow over the carcasses further lowers the effective freezing temperature, or "chill factor" to about −190 deg. Fahr. Generally, no more than about five minutes in the tunnels is required to crust the carcasses and to remove the required amount of total heat therefrom. The high velocity gas flow has the additional function of sublimating and removing any ice film formed on the surface of the carcasses by water expelled by shrinkage of the skin. Since the freezing proceeds from the skin surface inwardly, shrinkage thereof and consequent expulsion of sub-dermal water can occur before said water freezes solid. Thus the carcasses emerge from the tunnels with the skins taut, smooth and dry, with a desirable light, creamy color.

While the flow pattern of Grade A and undergrade carcasses and giblets to, through and from the freeze tunnels may assume many forms, an advantageous pattern is indicated in the flow chart of FIG. 1. Conveyor chain 22 makes two passes over conveyor belts 8, 28 and 30. The wrapped giblet packages prepared at the evisceration station arrive on belt 8. During the first pass of conveyor 22 over the belts, Grade A carcasses not scheduled to be stuffed with giblets, (or wogs) as well as undergraded carcasses, which are damaged and hence are usually not sold as whole, are removed from conveyor 22 to the belts, whereupon operators place the giblet packages and the undergrade carcasses in tunnel 24, and the wogs into tunnel 26. Only the Grade A carcasses to receive giblets are left on conveyor 22, which then travels to transport these carcasses past the discharge end of tunnel 24. Giblet packages, which have been freeze-crusted in tunnel 24, are discharged onto a conveyor belt 46, from which they are inserted by operators into the non-crusted Grade A carcasses passing this station. The freeze-crusting to which the giblets have been subjected hardens and stiffens the packages, so that they may be easily inserted into the carcasses. Due to the extremely soft, rather formless consistency of uncrusted giblets, except of course, the necks, they are extremely difficult to insert into carcasses, and even when crusted, they are far more easily inserted into uncrusted carcasses than into crusted ones. The uncrusted carcasses, each now containing a package of crusted giblets, are then transported by conveyor 22 to make a second pass past the entry ends of the tunnels, where they are unloaded from conveyor 22 and inserted into tunnel 26. In tunnel 26, the stuffed carcasses are freeze-crusted, but the giblets inside each carcass are somewhat insulated by said carcass from the $CO_2$ blast of the tunnel, and hence would not be effectively crusted if they had not been previously crusted in tunnel 24, and hence would be subject to later weepage before they could be lowered to the desired 28–30 deg. Fahr. stabilization temperature range.

At the discharge end of the tunnels, any unused giblet packages, and also undergrade carcasses, are passed to a conveyor belt 48. The giblets are generally then packed for bulk sale, while the damaged undergrade carcasses are generally slated for cut-up in order to salvage their usable parts. This cut-up may be performed in this process without cut-up weepage and weight loss if they are first allowed to temper to the 28–30 degree temperature range. The Grade A carcasses with giblets, and Grade A without giblets, or wogs, are removed from tunnel 26 at station 50 to a conveyor belt 52, from which the Grade A with giblets are loaded onto a conveyor chain 54 for transport to sizing, packaging and storage operations, while the wogs are loaded onto a conveyor chain 56 for transport to similar operations. Of course, some of the wogs may also be slated for cut-up after tempering.

Thus it will be apparent that a process having several advantages has been produced. It prevents costly weepage, during all of cut-ups, storage, shipping and handling. The meat produced is desirably moist, but not frozen, and with the best possible tenderness and flavor. Cut-up is easy and neat, without weight loss by weepage. It inhibits bacterial growth to lengthen the shelf life of the product. It does not require the use of either ice or mechanical refrigeration, and is hence more economical than other methods now in use. It provides a reliably uniform pick-up moisture content in the poultry, not materially affected by all-to-common misevisceration of the carcasses.

What I claim as new and desire to protect by Letters Patent is:

1. A method of preparing eviscerated poultry carcasses for fresh-pack handling, having a predetermined allowable content of pick-up moisture, said method consisting of the successive steps of:
   a. adding moisture in the form of water to eviscerated poultry carcasses with sufficient intimacy and thoroughness to ensure the pick-up of moisture by said carcasses well in excess of said predetermined allowable content plus the amount of moisture which may be removed from said carcasses by freeze-crusting thereof,
   b. removing moisture from said carcasses to reduce the pick-up moisture content thereof to a level generally equal to said predetermined allowable content plus the amount of moisture which may be removed therefrom by freeze-crusting thereof, and
   c. subjecting said carcasses to a supercold atmosphere for a time sufficient to freeze-crust the skin and surface portions thereof but not to freeze the deeper portions thereof, whereby the carcass skins shrink to expel moisture from said carcasses to reduce their pick-up moisture content to a level generally equal to said predetermined allowable amount.

2. A method as recited in claim 1 wherein said moisturizing step is accomplished by agitating said poultry carcasses in a bath of unrefrigerated water for a predetermined time period.

3. A method as recited in claim 1 wherein said moisture removal step includes the step of tumbling said carcasses for a predetermined time, said tumbling being effectual principally to expel moisture which may have collected in pockets between the skin and flesh, said pockets being greater in number in carcasses which have been miseviscerated, whereby to tend to equalize the moisture content of said miseviscerated carcasses with that of properly eviscerated carcasses.

4. A method as recited in claim 5 wherein said moisture removal step includes the additional step, following said tumbling but prior to said freeze-crusting, of gravity draining said carcasses, whereby to remove surface moisture and moisture which may have collected in variable amounts in the interior cavities of said carcasses, so that the pick-up moisture content of all of the carcasses is further equalized, but still above said predetermined allowable content.

5. A method as recited in claim 1 wherein said moisturized carcasses are delivered to said freeze-crusting step with a substantially uniform pick-up moisture content exceeding said predetermined allowable content by an amount generally equal to the amount of moisture which can be expelled by said freeze-crusting, it being known that the amount removable by freeze-crusting remains generally constant regardless of variations in the moisture content of the carcasses as they enter the freeze-crusting step.

6. A method as recited in claim 1 wherein said freeze-crusting step is regulated to remove an amount of heat from the carcasses such that when each carcass is later allowed to temper to a uniform temperature throughout its mass, it will be at a temperature above the approximate 26 deg. Fahr. freezing point of the flesh, but below the approximately 32 deg. Fahr. freezing point of water.

7. A method as recited in claim 1 wherein said freeze-crusting includes the additional step of passing said supercold atmosphere over said carcasses at high velocity, thereby both to still further lower the effective temperature of said atmosphere by allowing it to carry heat away from carcasses more rapidly and therefore to decrease the time required for freeze-crusting, and also to sublimate and carry away any moisture expelled during freeze-crusting and frozen at the surfaces of said carcasses.

8. A method as recited in claim 1 wherein said supercold atmosphere is produced by the expansion cooling of liquid carbon dioxide injected into the freeze-crusting zone.

* * * * *